United States Patent [19]

Kaye

[11] Patent Number: 4,550,409
[45] Date of Patent: Oct. 29, 1985

[54] INDUCED FLOW GAS TRANSPORT LASER

[75] Inventor: Alan S. Kaye, Wantage, England

[73] Assignee: United Kingdom Atomic Energy Authority, London, England

[21] Appl. No.: 413,619

[22] Filed: Sep. 1, 1982

[30] Foreign Application Priority Data

Sep. 17, 1981 [GB] United Kingdom ................ 8128175

[51] Int. Cl.4 .............................................. H01S 3/22
[52] U.S. Cl. ....................................... 372/59; 372/58; 372/87
[58] Field of Search ....................... 372/59, 89, 90, 58, 372/55, 87

[56] References Cited

U.S. PATENT DOCUMENTS

| 3,886,475 | 5/1975 | Pinsley | 372/58 |
| 3,970,957 | 7/1976 | Regan | 372/58 |
| 4,056,789 | 11/1977 | Stregack et al. | 372/58 |
| 4,188,592 | 2/1980 | Buczek et al. | 372/59 |
| 4,206,429 | 6/1980 | Pinsley | 372/55 |
| 4,351,052 | 9/1982 | Sasaki et al. | 372/58 |
| 4,375,687 | 3/1983 | Hook et al. | 372/701 |
| 4,457,000 | 6/1984 | Rao | 372/58 |

FOREIGN PATENT DOCUMENTS 1449056 9/1976 United Kingdom ................ 372/59

OTHER PUBLICATIONS

Willis et al.; "Sealed TEA $CO_2$, Lasers with External Control of Gas Chemistry"; Appl. Phys. Lett., vol. 31, No. 2, Jul. 15, 1972.

Primary Examiner—William L. Sikes
Assistant Examiner—Léon Scott, Jr.
Attorney, Agent, or Firm—William R. Hinds

[57] ABSTRACT

A transverse flow gas transport laser including a closed loop of ducting through which a gaseous lasing medium can be circulated so as to pass continuously through a lasing region of the ducting in which it can be excited into lasing activity, in which there is included means for extracting a portion of the gaseous lasing medium from a region of the ducting other than the lasing region, comprising the said portion of the lasing medium and injecting it back into the remainder of the lasing medium thereby to induce flow of the gaseous medium through the lasing region of the ducting.

6 Claims, 1 Drawing Figure

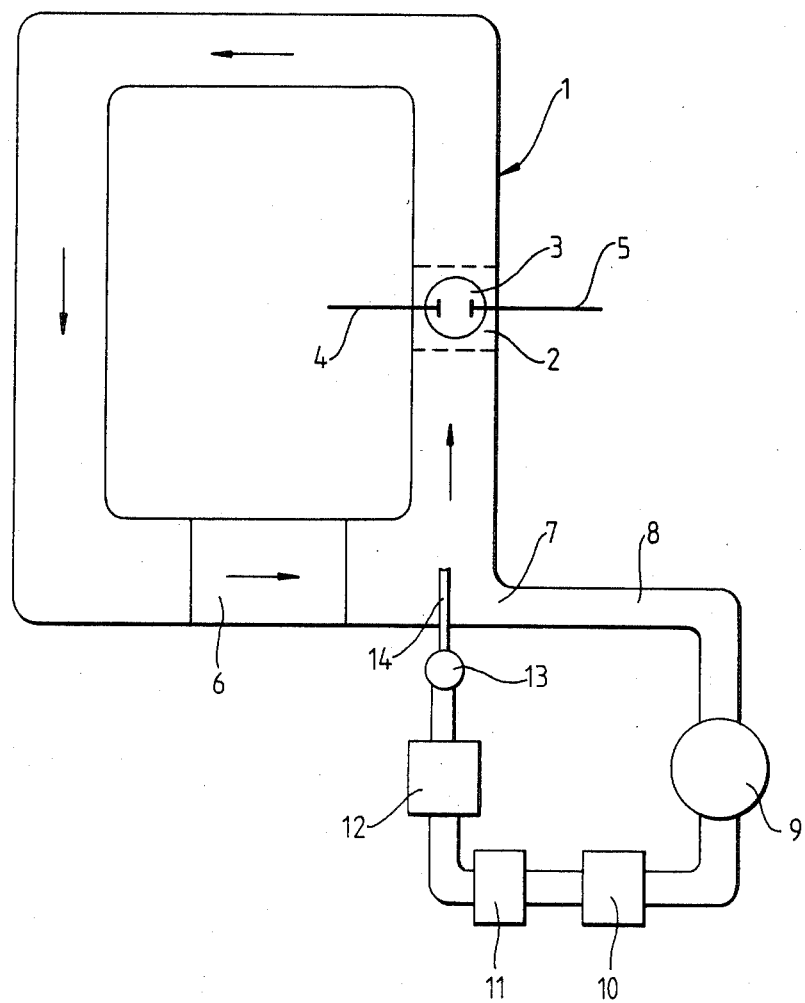

INDUCED FLOW GAS TRANSPORT LASER

The present invention relates to gas transport lasers, that is to say, lasers in which a gaseous lasing medium is circulated around a loop of ducting which includes a lasing region which forms part of an optical cavity in which lasing activity can take place, means for exciting the gaseous lasing medium in the lasing region of the ducting which forms part of the optical cavity, and other regions in which the lasing medium is acted upon in some way, for example, it may be cooled or have its constitution restored in some way.

A particular form of gas transport laser is that known as a transverse flow laser. In such lasers, the direction of flow of the gaseous lasing medium is transverse to the optical axis of the optical cavity. Typically, the duct has a rectangular cross-section with an aspect ratio of about 20:1 in the lasing region which forms part of the optical cavity, and the optical axis of the optical cavity is aligned with the major axis of the lasing region of the rectangular duct.

For the successful operation of such a laser it is necessary for the lasing medium to pass through the lasing region with a constant velocity profile. Transverse flow gas transport lasers usually operate at flow velocities in the region of Mach 0.1, and require a low pressure ratio (typically 1.1:1) across the compressor which is used to produce the gas flow. Pressure ratios of this value readily can be produced by high speed axial flow fans. However, such fans utilise ducts which have circular cross-sections and it is difficult and expensive to effect a transformation from the circular cross-section of the fan duct, or ducts if more than one fan is used, to the rectangular cross-section of the lasing region of the rest of the loop of ducting without setting up unstable irregularities in the flow of the lasing medium.

According to the present invention there is provided a gas transport laser of the type described in which there is included means for extracting a portion of the gaseous lasing medium from a region of the ducting other than the lasing region, compressing the said portion of the lasing medium and injecting it back into the remainder of the lasing medium thereby to induce flow of the gaseous medium through the lasing region of the ducting.

The may also be included means for cooling the said portion of the lasing medium and/or ensuring that it has a desired constitution.

The invention will now be described, by way of example, with reference to the accompanying drawing which is a diagrammatic representation of a gas transport laser embodying the invention.

Referring to the drawing, a gas transport laser consists of a closed loop of ducting, 1 having a rectangular cross-section. A region 2 of the ducting 1 is adapted to form an optical cavity 3 in which lasing activity can take place in a gaseous lasing medium which is circulated around the loop of ducting 1 in the direction shown by the arrows. The active constituent of the lasing medium is carbon dioxide. The optical axis of the optical cavity 3 is perpendicular to the plane of the drawing. Hence neither the windows in the wall of the ducting 1 nor the external mirrors which form the optical cavity 3 are shown in the drawing. Mounted in opposite walls of the lasing region 2 of the ducting 1 are anode and cathode electrodes 4 and 5, respectively, by means of which the gaseous lasing medium can be stimulated into laser action. The electrodes 4 and 5 extend parallel to the optical axis of the optical cavity 3. Also included in the loop of ducting 1 is a heat exchanger 6 by means of which the lasing medium can be cooled after it has undergone lasing action. The transverse dimensions of the lasing region 2 of the loop of ducting 1 are 1×0.05 m, giving an aspect ratio of 20:1.

Upstream of the lasing region 2 of the ducting 1 is a take-off point 7 for a by-pass loop 8. The by-pass loop 8 includes a pump/compressor 9, a heat exchanger 10, a catalyst unit 11, a dryer 12, a manifold 13 and a series of injector nozzles 14. In operation, a proportion, about 25%, of the lasing medium is drawn off by the pump/compressor 9, compressed by a factor of about 2, passed through the heat exchanger 10 where it is cooled, the catalyst unit 11 where any carbon dioxide which has dissociated into carbon monoxide is reformed and, the dryer 12. It is then injected back into the main body of the lasing medium via the manifold 13 and the nozzles 14 at a velocity of about Mach 1. The injected lasing medium entrains the lasing medium in the surrounding shear layer, and so induces turbulent flow in the lasing medium. By the time the lasing medium has reached the lasing region 2 of the ducting 1, it has acquired a flat velocity profile.

A suitable type of pump/compressor is that known as a Roots blower. Such devices are available readily commercially over a wide range of throughputs. A pump/compressor can therefore be matched to a similar wide range of sizes of laser.

In the laser which has been described, the lasing region 2 is located in the highly turbulent region immediately downstream of the nozzles 14. In such an arrangement, the nozzles 14 can be used as electrodes for exciting the lasing medium. Such an arrangement has the advantage that the injected portion of the gaseous lasing medium helps to dissipate the electrical power which is deposited in the electrodes. Alternatively, the lasing region 2 can be formed well away from the nozzles 14 where the flow of the lasing medium is quiescent.

I claim:

1. A transverse flow gas transport laser comprising, a loop of ducting including a lasing region which forms part of an optical cavity in which lasing action can take place, means for circulating a gaseous lasing medium around the loop of ducting, means for exciting the gaseous lasing medium in the lasing region of the ducting so as to cause lasing action to take place, wherein the means for circulating the gaseous lasing medium around the loop of ducting comprises means for extracting a portion of the gaseous lasing medium from a region of the ducting other than the lasing region, compressing the said portion of the lasing medium and injecting it back into the remainder of the lasing medium via at least one nozzle so oriented that the injected lasing medium will issue from the nozzle with it major component of velocity in the direction of and greater then the velocity of the flow of the lasing medium as a whole so as to induce flow of the gaseous medium through the lasing region of the ducting and around the loop of ducting.

2. A transverse flow gas laser according to claim 1, wherein said nozzle comprises electrode means for exciting an electrical discharge in the gaseous lasing medium.

3. A transverse flow gas laser according to claim 1 or claim 2, including means for cooling and/or ensuring that the said portion of the lasing medium has a desired composition.

4. A transverse flow gas laser according to claim 1, wherein the said portion of the lasing medium is injected back into the remainder of the lasing medium at a velocity approaching Mach 1.

5. A transverse flow gas laser according to claim 1, wherein the means for extracting a portion of the gaseous lasing medium from the said region of the ducting comprises means for extracting approximately a quarter of the gaseous lasing medium flowing through the said region of the ducting.

6. A transverse flow gas transport laser comprising, a loop of ducting including a lasing region which forms part of an optical cavity in which lasing action can take place, means for circulating a gaseous lasing medium around the loop of ducting, means for exciting the gaseous lasing medium in the lasing region of the ducting so as to cause lasing action to take place, wherein the means for circulating the gaseous lasing medium around the loop of ducting comprises means for extracting a portion of the gaseous lasing medium from a region of the ducting other than the lasing region, compressing the said portion of the lasing medium and injecting it back into the remainder of the lasing medium via at least one nozzle oriented such that the injected lasing medium entrains other lasing medium in the ducting and induces the flow of the gaseous medium through the lasing region of the ducting and around the loop of ducting.

* * * * *